United States Patent
Kawai

(10) Patent No.: US 6,211,507 B1
(45) Date of Patent: Apr. 3, 2001

(54) SIGNAL CHARGE TRANSFERRING METHOD IN IMAGE SENSOR IN WHICH CLOCK SIGNAL PHASE IS SWITCHED

(75) Inventor: Shinichi Kawai, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/170,719

(22) Filed: Oct. 14, 1998

(30) Foreign Application Priority Data

Oct. 15, 1997 (JP) ................................................ 9-282226

(51) Int. Cl.[7] ................................................ H01J 40/14
(52) U.S. Cl. .......................................... 250/208.1; 348/303
(58) Field of Search .......................... 250/208.1; 348/303, 348/304, 308, 283

(56) References Cited

U.S. PATENT DOCUMENTS 4,314,275 * 2/1982 Chapman ................................ 358/113
5,600,127 * 2/1997 Kimata ................................ 250/208.1

FOREIGN PATENT DOCUMENTS

| 63-250980 | 10/1988 | (JP) . |
| 2-196567 | 8/1990 | (JP) . |
| 3-153176 | 7/1991 | (JP) . |
| 3-231580 | 10/1991 | (JP) . |
| 3-238983 | 10/1991 | (JP) . |
| 4-262679 | 9/1992 | (JP) . |
| 6-165041 | 6/1994 | (JP) . |

* cited by examiner

Primary Examiner—Stephone B. Allen
(74) Attorney, Agent, or Firm—Sughrue, Mion, Zinn, Macpeak & Seas, PLLC

(57) ABSTRACT

An image sensor includes photoelectric converting elements arranged in a column direction. Each of the converting elements generates signal charge. K transfer electrodes (k is a positive integer more than 1) are provided for each of the photoelectric converting elements in the column direction. 2k signal lines are connected to the transfer electrodes for adjacent two of said photoelectric converting elements. The 2k signal lines are used to supply driving clock signals to the transfer electrodes for the adjacent two photoelectric converting elements, respectively. As a result, the signal charges are transferred based on the driving clock signals.

16 Claims, 18 Drawing Sheets

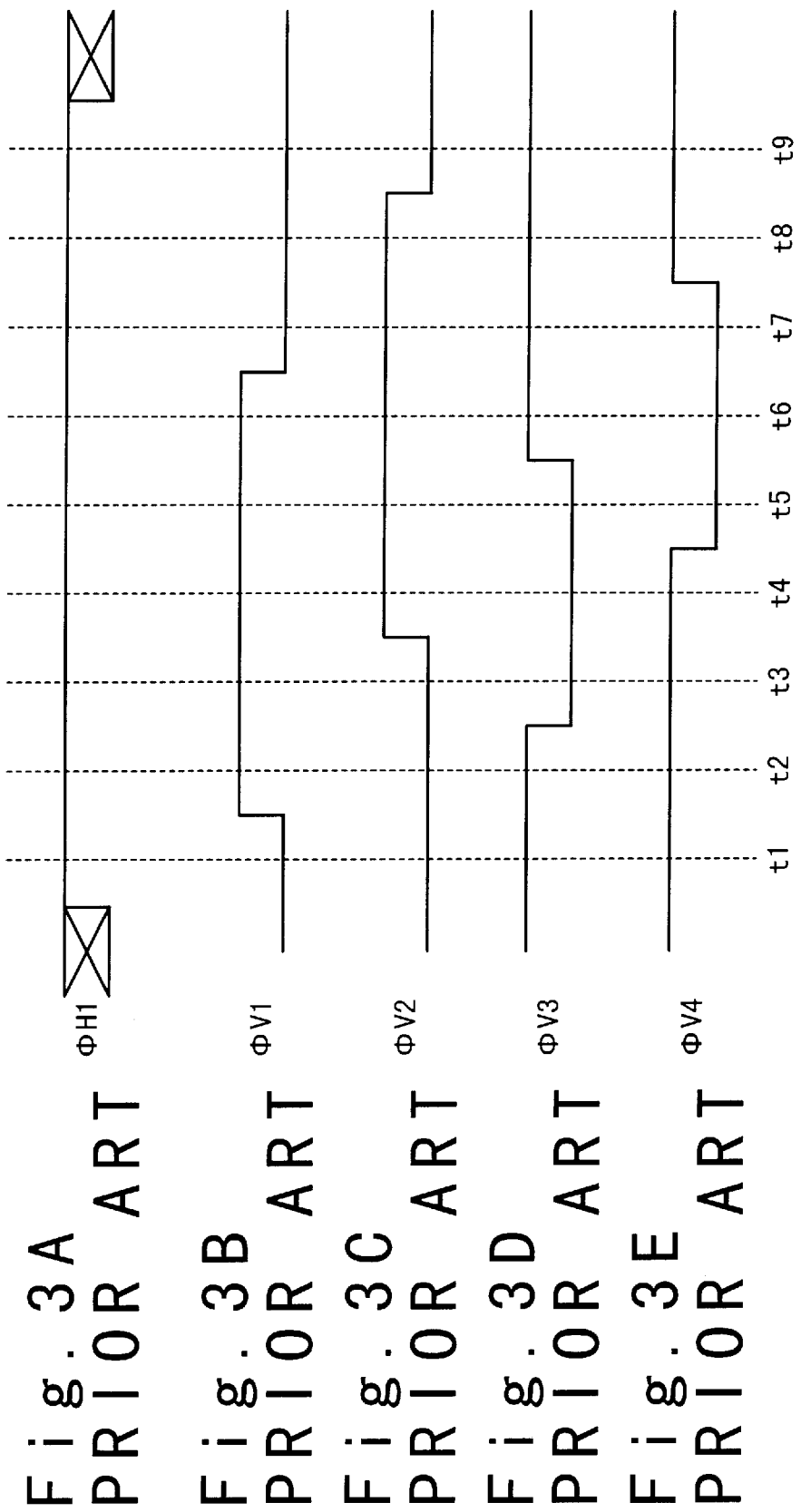

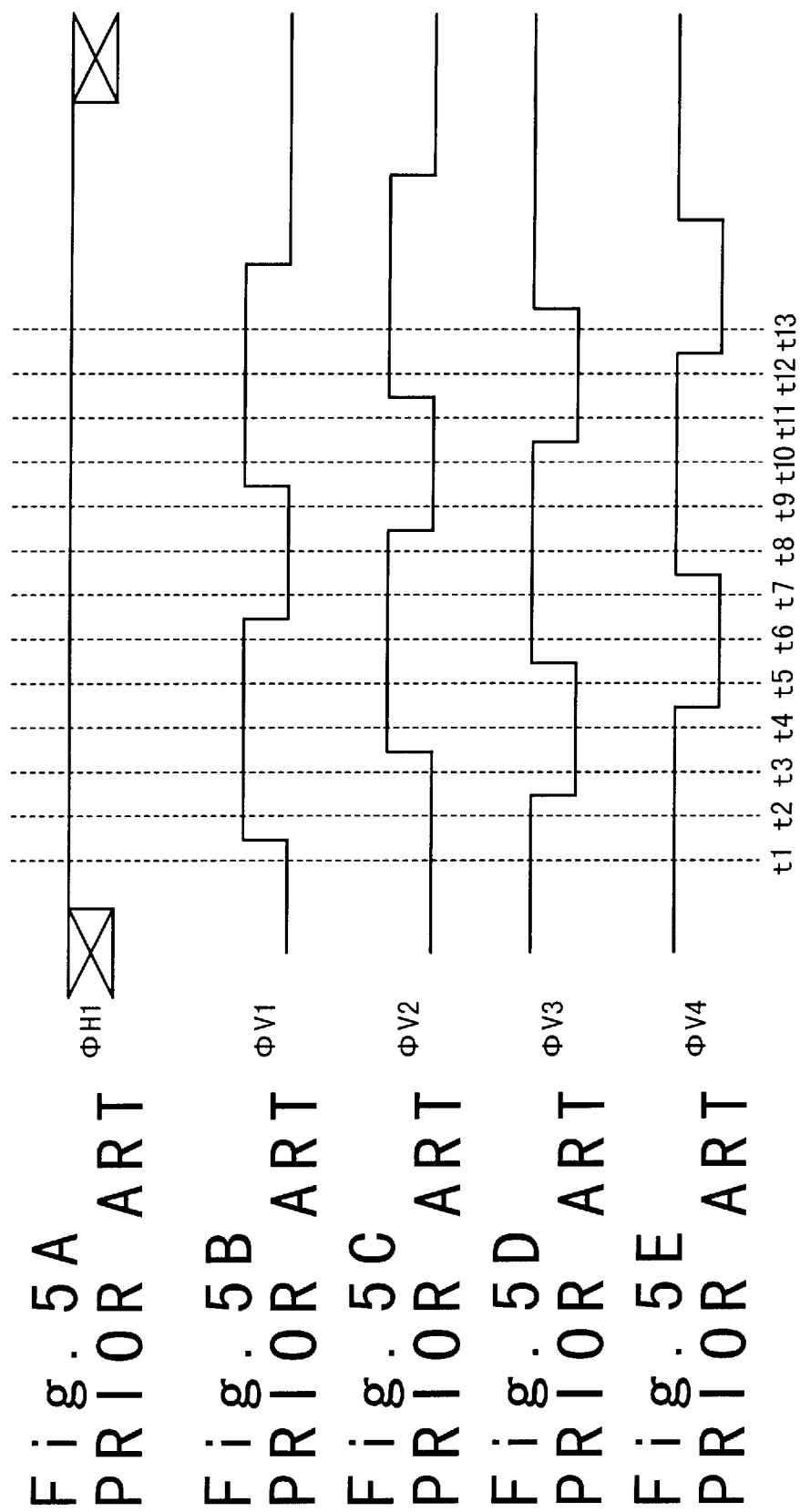

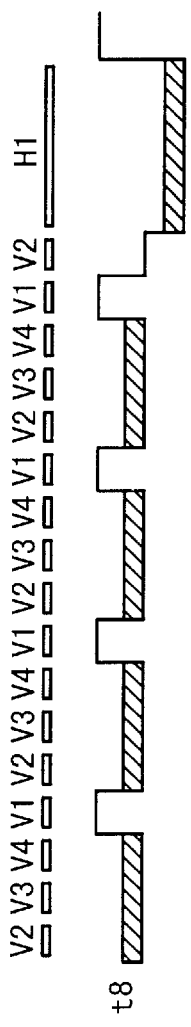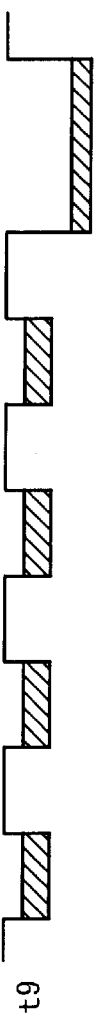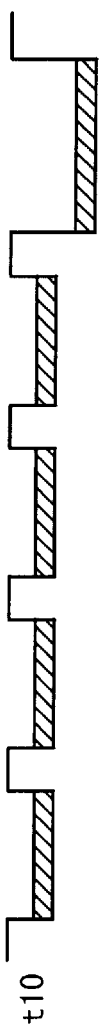
Fig. 6H PRIOR ART
Fig. 6I PRIOR ART
Fig. 6J PRIOR ART
Fig. 6K PRIOR ART
Fig. 6L PRIOR ART
Fig. 6M PRIOR ART

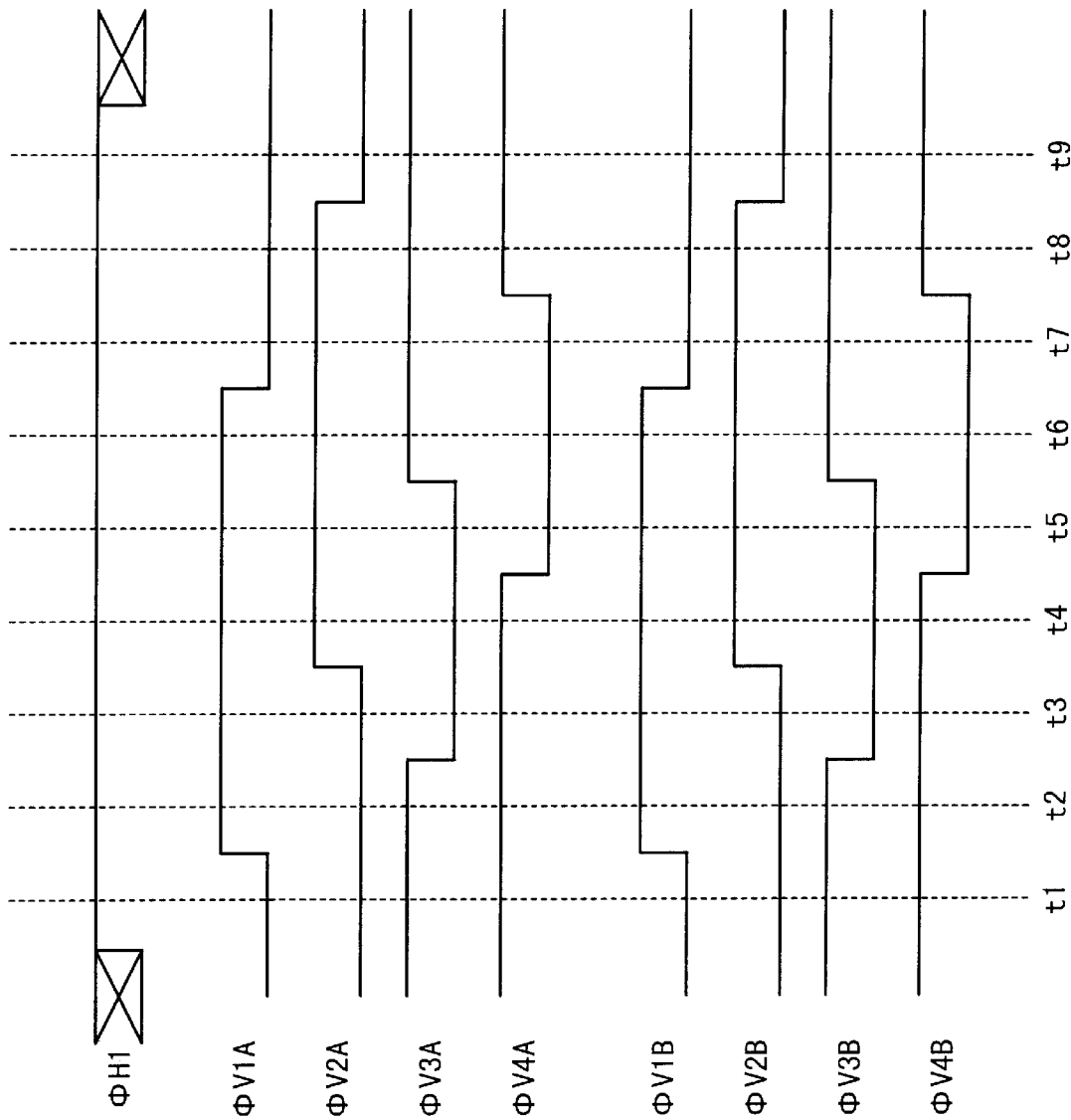

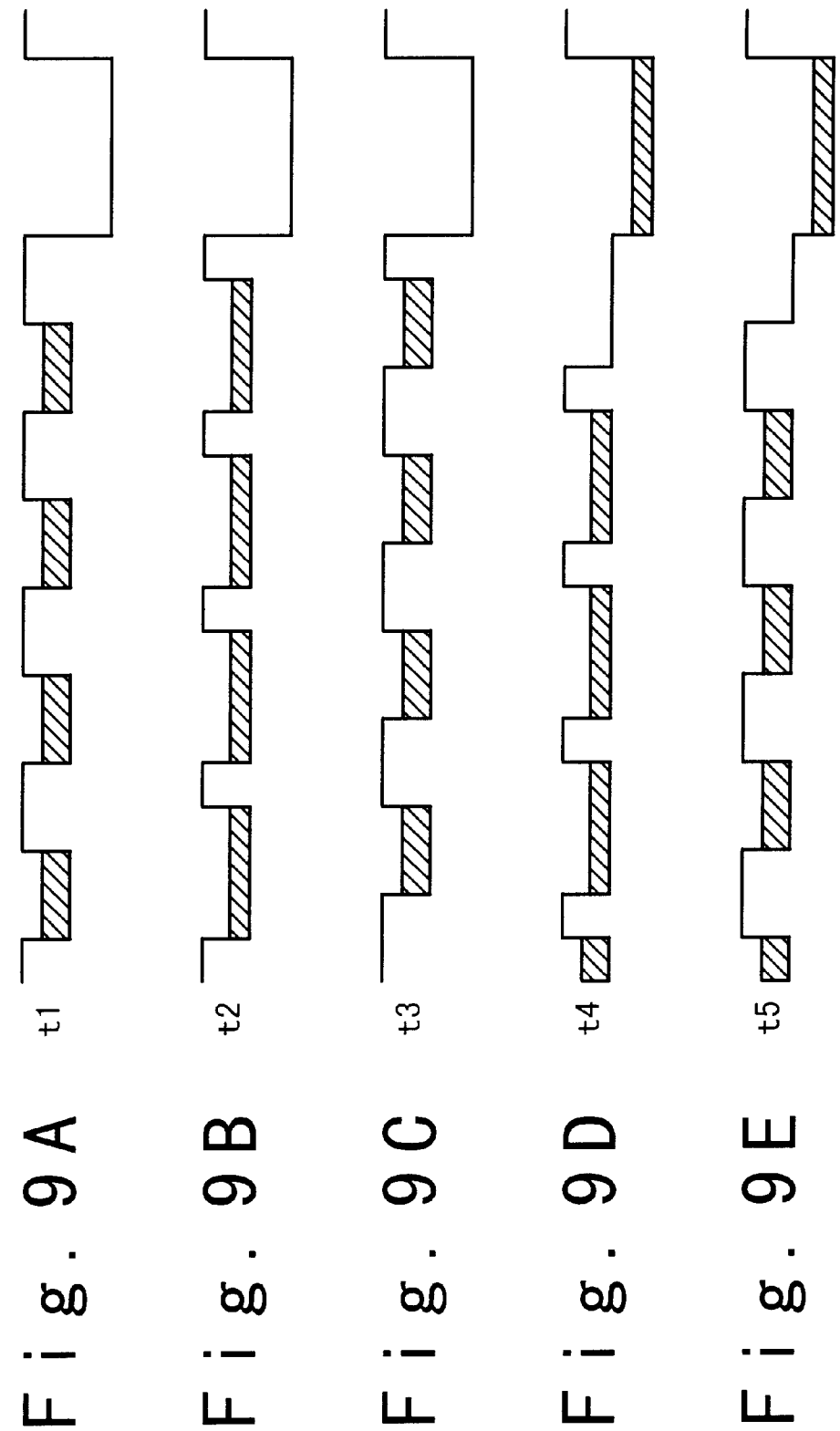

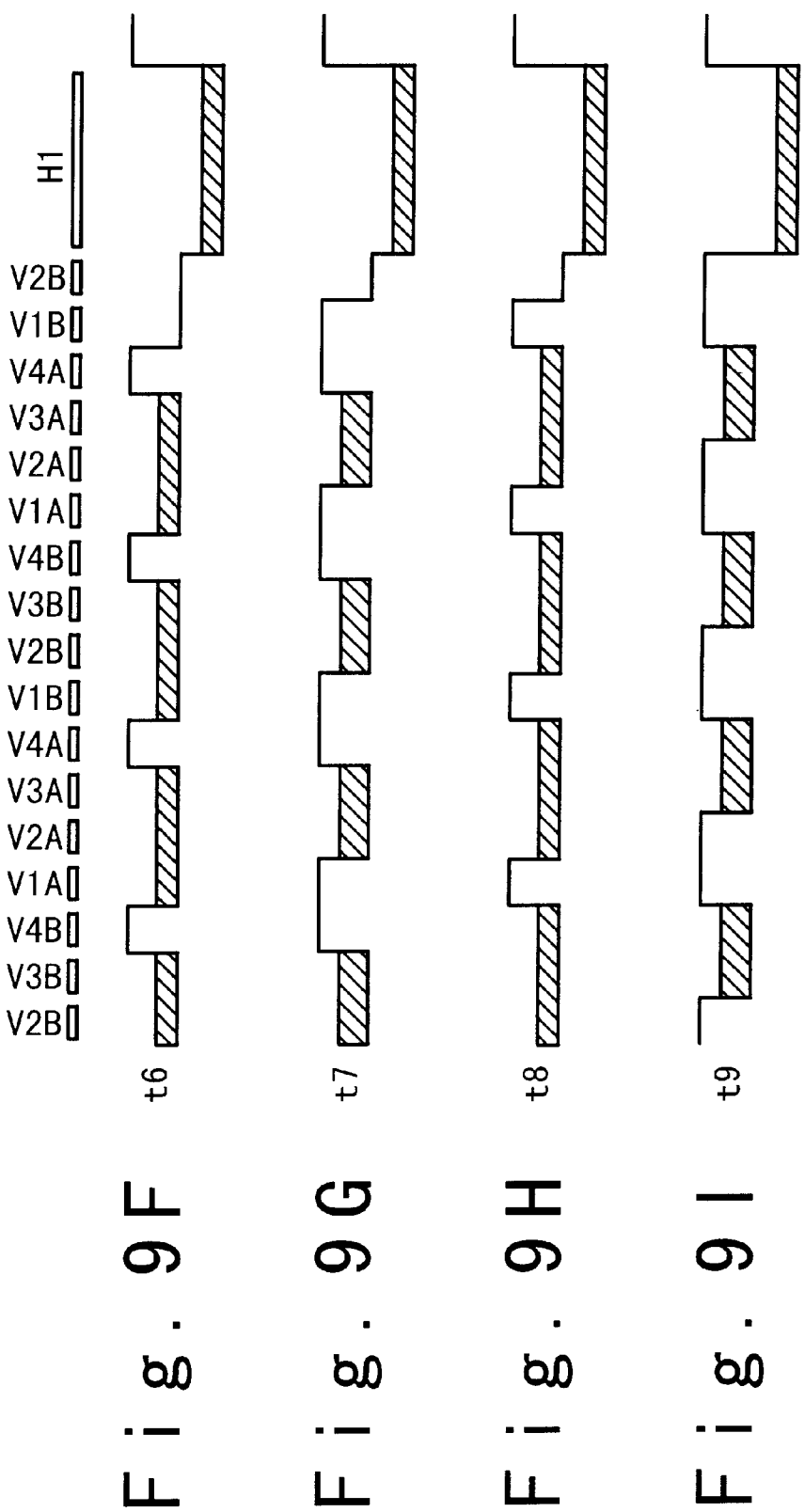

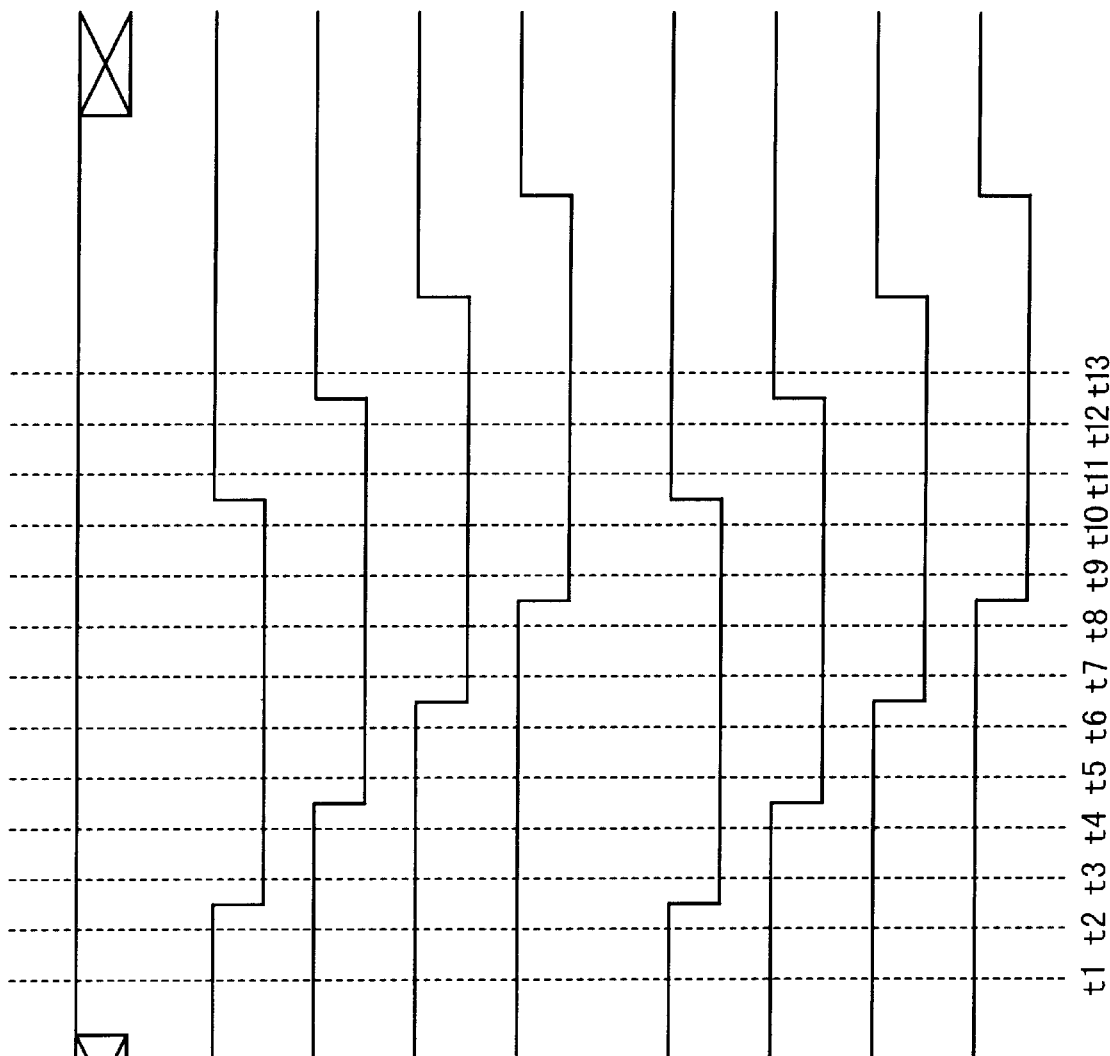

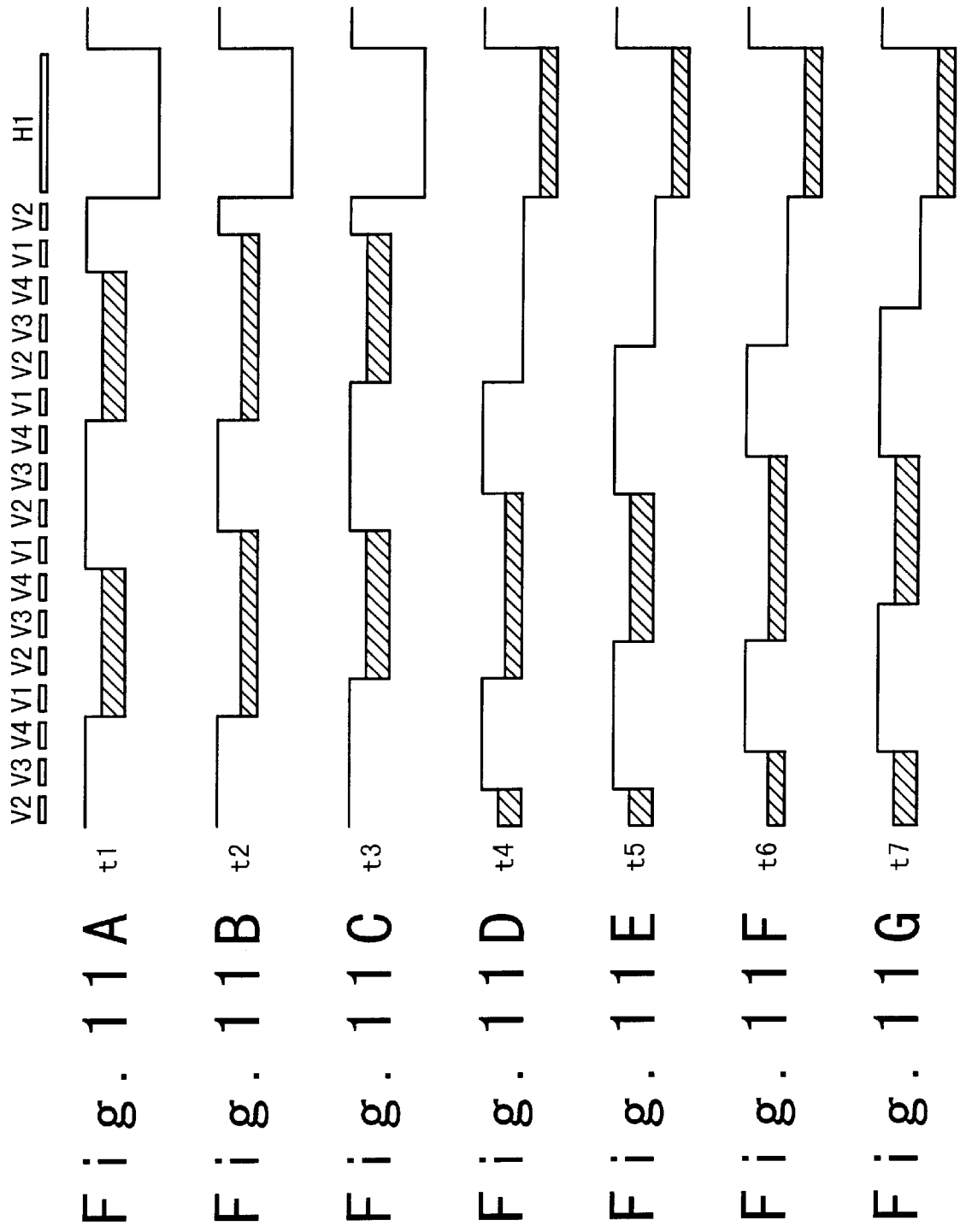

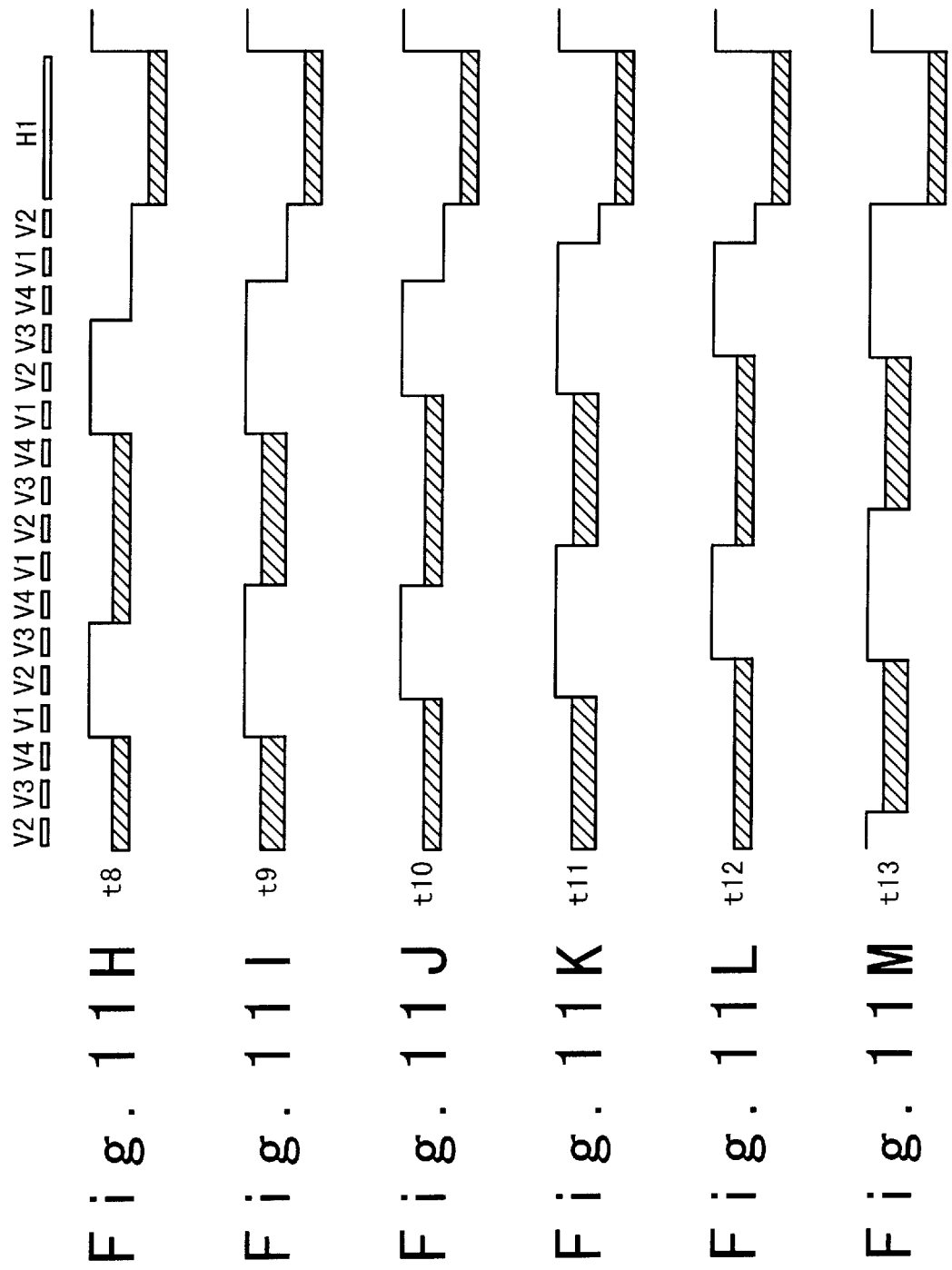

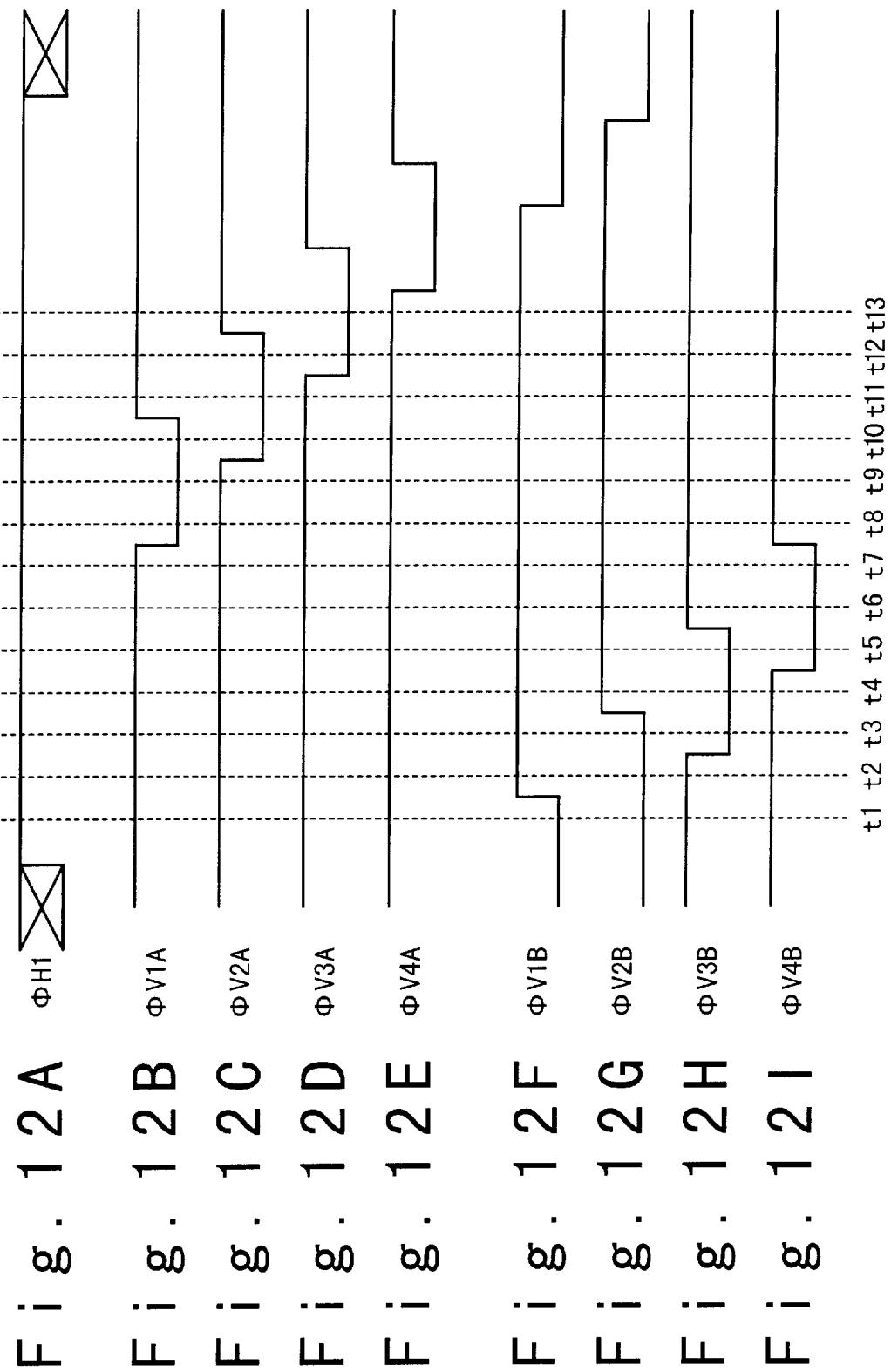

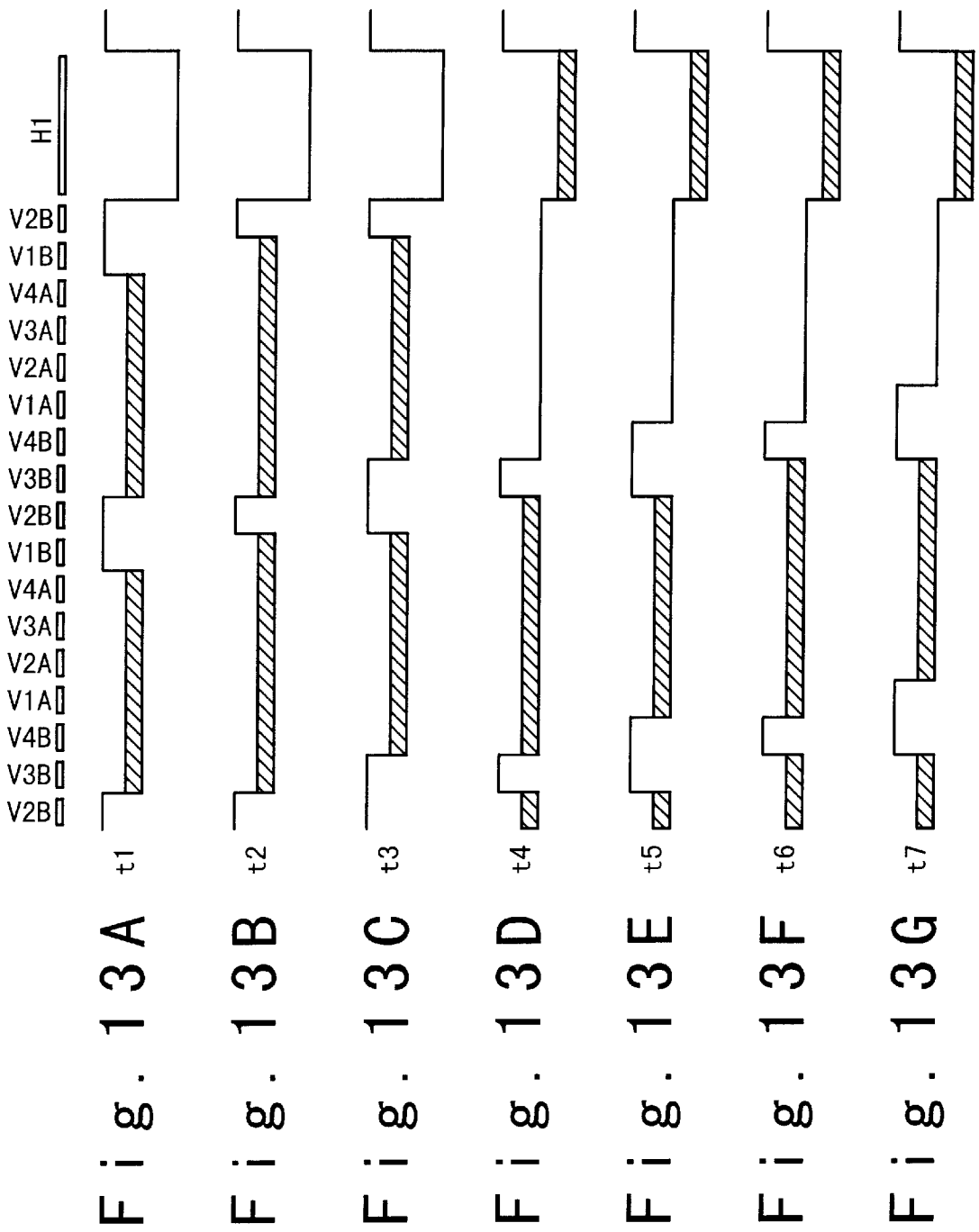

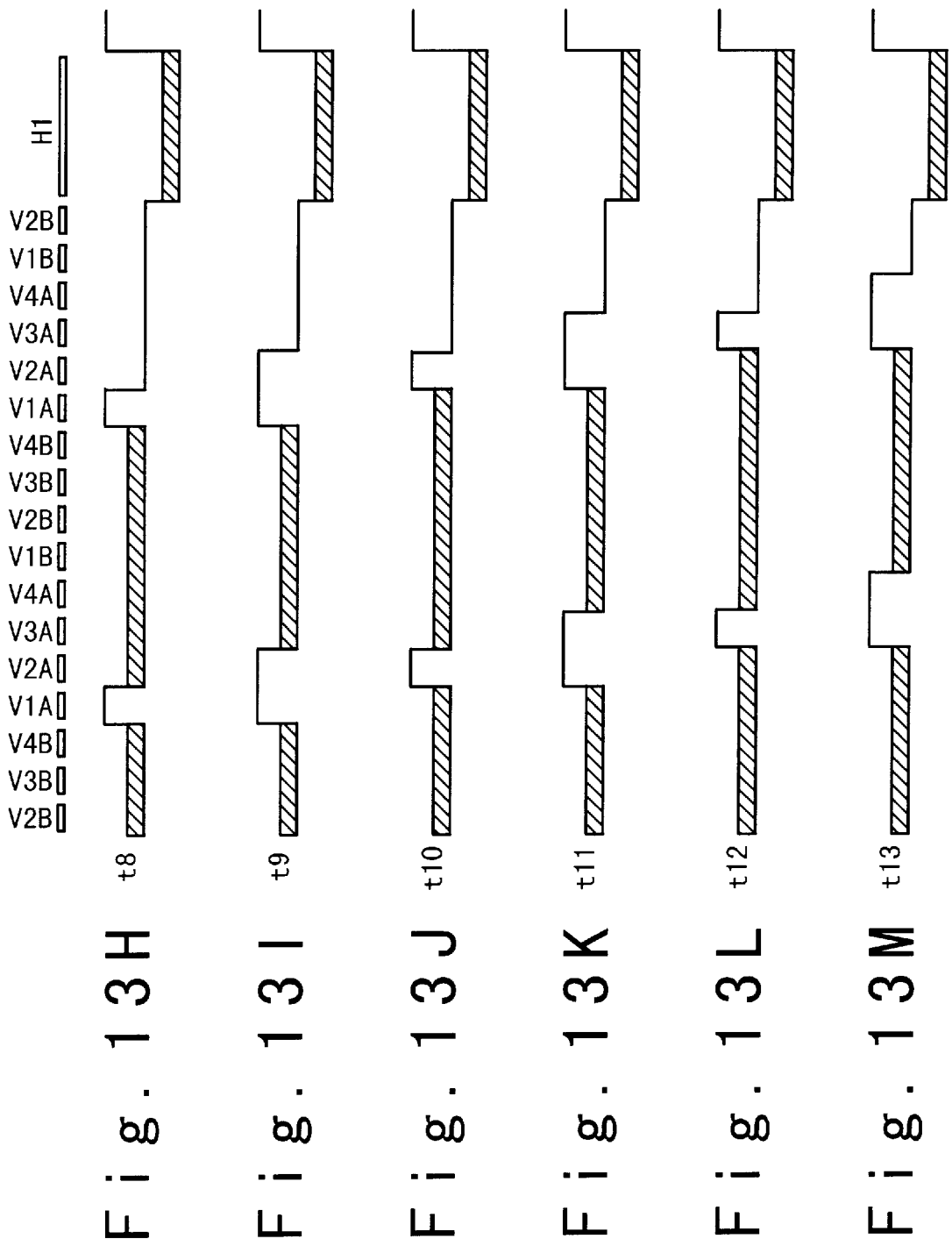

SIGNAL CHARGE TRANSFERRING METHOD IN IMAGE SENSOR IN WHICH CLOCK SIGNAL PHASE IS SWITCHED

BACKGROUND OF THE INVENTION

1. Field of the Invention

The present invention relates to a solid state image sensor and a method of driving the same.

2. Description of the Related Art

FIG. 1 is a diagram illustrating the structure of an interline transfer type solid state image sensor. In the interline transfer type solid state image sensor shown in FIG. 1, on a semiconductor substrate 801 are arranged groups of vertical charge transfer registers 802, groups of photoelectric converting elements 803, and a group of horizontal charge transfer registers 804. Each of the groups of vertical charge transfer registers 802 is composed of a plurality of charge transfer registers in a vertical direction. Each of the group of photoelectric converting elements 803 is provided for one of the groups of vertical charge transfer registers 802. The group of horizontal charge transfer registers 804 are electrically connected to the one end of each of the groups of vertical charge transfer registers 802. Also, a charge detecting section 805 is provided to be electrically connected to the one end of the group of horizontal charge transfer registers 804. A signal outputted from the charge detecting section 805 is outputted outside through an output terminal 806.

FIG. 2 is a diagram to explain the arrangement of transfer electrodes of the group of vertical charge transfer registers and the photoelectric converting elements and the connection between bus lines and the transfer electrodes. The solid state image sensor shown in FIG. 2, the group of vertical charge transfer registers are driven in 4-phase pulses signal. In FIG. 2, four vertical transfer electrodes 901 are provided for one photoelectric converting element 803 to form a unit pixel. The vertical transfer electrodes 901 are connected to the same bus line 902 for every four electrodes. Also, a horizontal transfer electrode 903 is provided for the one end of the group of vertical charge transfer registers.

In such a solid state image sensor, two operations could be needed, one is the operation in which the signal charge of each photoelectric converting element is individually read, and the other is the operation in which the signal charges of two adjacent photoelectric converting elements in the vertical direction are added and read. When the signal charges of two photoelectric converting elements are added and outputted, the resolution of the solid state image sensor decreases. However, the time required to output the signal charges of all the photoelectric converting elements can be made short. Also, when the solid state image sensor is driven in an interlace mode, the signal charges of two adjacent photoelectric converting elements in the vertical direction are added and outputted.

In the solid state image sensor, as a method of switching between an individual pixel read mode and a 2-pixel read mode in which the signal charges of two adjacent photoelectric converting elements in the vertical direction are added and read, there is a method in which the signal charges in the groups of vertical charge transfer registers are transferred twice in a horizontal blanking period. This method is described in Japanese Laid Open Patent Application (JP-A-Heisei 4-262679). The charge transfer of the group of vertical charge transfer registers in the horizontal blanking period is performed once in the individual pixel read mode (the signal charge for one pixel is transferred) and twice in the 2-pixel read mode (the signal charges for two pixels are transferred).

FIGS. 3A to 3E are timing charts of the pulses which are applied to the vertical transfer electrodes and the horizontal transfer electrode during the horizontal blanking period in the individual pixel read mode. In this case, only the pulse φH1 which is applied to the horizontal transfer electrode 903 is shown as a horizontal drive pulse. FIGS. 4A to 4I are diagrams illustrating the accumulation states of the signal charges in the group of vertical charge transfer registers at each timing of FIGS. 3A to 3E.

When a high voltage pulse is applied once to the vertical transfer electrodes during the horizontal blanking period, the signal charge is read from the photoelectric converting element 803 to the vertical charge transfer register 802 and then is transferred for one pixel in the group of vertical charge transfer registers. At this time, the signal charge of the last stage of vertical charge transfer register is transferred to the horizontal charge transfer register. When receiving the signal charges for one row from the groups of vertical charge transfer registers, the group of horizontal charge transfer registers transfer the received signal charges to the output section in order. By repeating the above operation for all pixels in the vertical direction, the signal charges of all the pixels of the imaging region are outputted.

FIGS. 5A to 5E are timing charts of the pulses which are applied to the vertical transfer electrodes and the horizontal transfer electrode during the horizontal blanking period in the 2-pixel read mode. Also, FIGS. 6A to 6M are diagrams illustrating the accumulation states of signal charges in the groups of vertical charge transfer registers at each timing of FIGS. 5A to 5E.

When a pulse is applied twice to each vertical transfer electrode during the horizontal blanking period, the signal charges are read from the photoelectric converting element 803 to the group of vertical charge transfer registers 802 and then are transferred for 2 pixels in the group of vertical charge transfer registers. At this time, the signal charge of the last stage of vertical charge transfer register and the signal charge of and the stage previous to the last stage of vertical charge transfer register are continuously transferred to the group of horizontal charge transfer registers to be added to each other in the horizontal charge transfer register. When receiving the signal charges for 2 pixels from the group of vertical charge transfer register, the group of horizontal charge transfer registers transfer the received signal charges to the output section in order. By repeating the above operation for a half of the number of pixels in the vertical direction, the signal charges of all the pixels of the imaging region are outputted.

By the way, when a pulse is applied twice to each vertical transfer electrode during the horizontal blanking period in the 2-pixel read mode, the width of the pulse becomes short. In the conventional example of the solid state image sensor, when the width of the pulse becomes short, the amplitude of the drive pulse becomes substantially small because of the influence of the pulse propagation delay by the capacity and resistance of the transfer electrode. For this reason, the maximum transfer quantity of signal charge by the vertical charge transfer register decreases.

Also, if the horizontal blanking period is made long so as to suppress the pulse propagation delay, the time given to output the signal charges from the group of horizontal charge transfer registers becomes short. Therefore, it is necessary to increase the frequency of pulses used to drive the group of horizontal charge transfer registers. As a result, the transfer failure in the group of horizontal charge transfer registers, and the increase of the power consumption in a driving circuit of the solid state image sensor.

In addition to the above reference, a driving method in an solid state image sensor is known in Japanese Laid Open Patent Application (JP-A-Heisei 2-196567). In this reference, a plurality of photoelectric converting elements are arranged in a matrix manner to form pixels. A vertical transfer stage is provided for each of the plurality of photoelectric converting elements and reads a signal charge from the photoelectric converting element and transfers in the vertical direction. A horizontal transfer stage is supplied with the signal charges transferred from a vertical transfer means composed of a plurality of vertical transfer stages in the vertical direction. The signal charge is transferred for two vertical transfer stages during one horizontal blanking period such that the signal charges are added in the horizontal transfer stage.

SUMMARY OF THE INVENTION

The present invention is accomplished in view of the above problems. Therefore, an object of the present invention is to provide a solid state image sensor and a driving method for the same, in which power consumption can be decreased and the maximum transfer quantity of signal charges can be increased.

In order to achieve an aspect of the present invention, an image sensor includes photoelectric converting elements arranged in a column direction, for generating signal charges, respectively. K transfer electrodes (k is a positive integer more than 1) are provided for each of the photoelectric converting elements in the column direction. 2k signal lines are connected to the transfer electrodes for adjacent two of the photoelectric converting elements, and are used to supply driving clock signals to the transfer electrodes for adjacent two photoelectric converting elements, respectively, such that the signal charges are transferred based on the driving clock signals.

The image sensor further includes a driving control circuit connected to the 2k signal lines, for switching a number of phases of the driving clock signals based on a mode.

In this case, the driving control circuit supplies the driving clock signals of k phases to the 2k signal lines in an individual pixel read mode such that an in-phase driving clock signal is supplied to corresponding ones of the transfer electrodes for the adjacent two photoelectric converting elements. The driving control circuit supplies the driving clock signals of phases different from those in the individual pixel read mode to the 2k signal lines in a 2-pixel read mode such that the signal charges of the adjacent two of the photoelectric converting elements are added in response to the supply of the driving clock signals to the transfer electrodes for the adjacent two of the photoelectric converting elements. The driving control circuit supplies the driving clock signals of 2k phases to the 2k signal lines in a 2-pixel read mode such that the driving clock signals of different phases are respectively supplied to the transfer electrodes for the adjacent two photoelectric converting elements.

In the above, when k is 4, the signal charges of the adjacent two of the photoelectric converting elements are transferred in a state in which the signal charges are accumulated under 4 or 5 continuous ones of the transfer electrodes.

Also, when k is 4, the signal charges of the adjacent two of the photoelectric converting elements are transferred in a state in which the signal charges are accumulated under 6 or 7 continuous ones of the transfer electrodes.

In order to achieve another aspect of the present invention, a method of transferring signal charge in an image sensor, includes the steps of:

generating signal charges by photoelectric converting elements arranged in a column direction;

outputting driving clock signals to 2k (k is a positive integer more than 1) signal lines;

transferring the signal charges by transfer electrodes in response to the driving clock signals, wherein k ones of the transfer electrodes are provided for each of the photoelectric converting elements in the column direction, and 2k continues ones of the transfer electrodes are respectively connected to the 2k signal lines.

The method may further include the step of switching a number of phases of the driving clock signals based on a mode.

The outputting step may include outputting the driving clock signals of k phases to the 2k signal lines in an individual pixel read mode such that an in-phase driving clock signal is supplied to corresponding ones of the transfer electrodes for adjacent two of the photoelectric converting elements.

Also, the outputting step may include outputting the driving clock signals of phases different from those in the individual pixel read mode to the 2k signal lines in a 2-pixel read mode such that the signal charges of the adjacent two of the photoelectric converting elements are added in response to the supply of the driving clock signals to the transfer electrodes for the adjacent two of the photoelectric converting elements.

Further, the outputting step may include outputting the driving clock signals of 2k phases to the 2k signal lines in a 2-pixel read mode such that the driving clock signals of different phases are respectively supplied to the transfer electrodes for the adjacent two of the photoelectric converting elements.

In the above, when k is 4, the transferring step may include transferring the signal charges of the adjacent two of the photoelectric converting elements in a state in which the signal charges are accumulated under 4 or 5continuous ones of the transfer electrodes.

Also, when k is 4, the transferring step may include transferring the signal charges of the adjacent two photoelectric converting elements are transferred in a state in which the signal charges are accumulated under 6 or 7 continuous ones of the transfer electrodes.

BRIEF DESCRIPTION OF THE DRAWINGS

FIGS. 3A to 3E are timing charts of the pulses which are applied to the vertical transfer electrodes and a horizontal transfer electrode during a horizontal blanking period in an individual pixel read mode;

FIGS. 5A to 5E are timing charts of the pulses which are applied to the vertical transfer electrodes and the horizontal transfer electrode during the horizontal blanking period in a 2-pixel read mode;

FIGS. 6A to 6M are diagrams illustrating the accumulation states of the signal charges in the groups of vertical charge transfer registers at each timing of FIGS. 5A to 5E;

FIGS. 8A to 8I are timing charts illustrating the pulses which are applied to the group of vertical transfer electrodes and a horizontal transfer electrode during a horizontal blanking period, in an individual pixel read mode in the solid state image sensor according to the first embodiment of the present invention;

FIGS. 9A to 9I are diagrams illustrating the accumulation states of the signal charges by the vertical charge transfer registers at each timing of FIGS. 8A to 8I in the solid state image sensor according to the first embodiment of the present invention;

FIGS. 10A to 10I are timing charts illustrating the pulses which are applied to the vertical transfer electrodes and the horizontal transfer electrode during the horizontal blanking period, in a 2-pixel read mode in the solid state image sensor according to the first embodiment of the present invention;

FIGS. 11A to 11M illustrating the accumulation states of signal charges by the group of vertical charge transfer registers at each timing of FIGS. 10A to 10I in the solid state image sensor according to the first embodiment of the present invention;

FIGS. 12A to 12I are timing charts illustrating the pulses which are applied to the vertical transfer electrodes and the horizontal transfer electrode during the horizontal blanking period in the 2-pixel read mode in the solid state image sensor according to a second embodiment of the present invention; and FIGS. 13A to 13M are diagrams illustrating the accumulation states of the signal charges in the group of vertical charge transfer registers at each timing of FIGS. 12A to 12I in the solid state image sensor according to the second embodiment of the present invention.

DESCRIPTION OF THE PREFERRED EMBODIMENTS

Next, a solid state image sensor of the present invention will be described below in detail with reference to the attached drawings.

Figure 1:
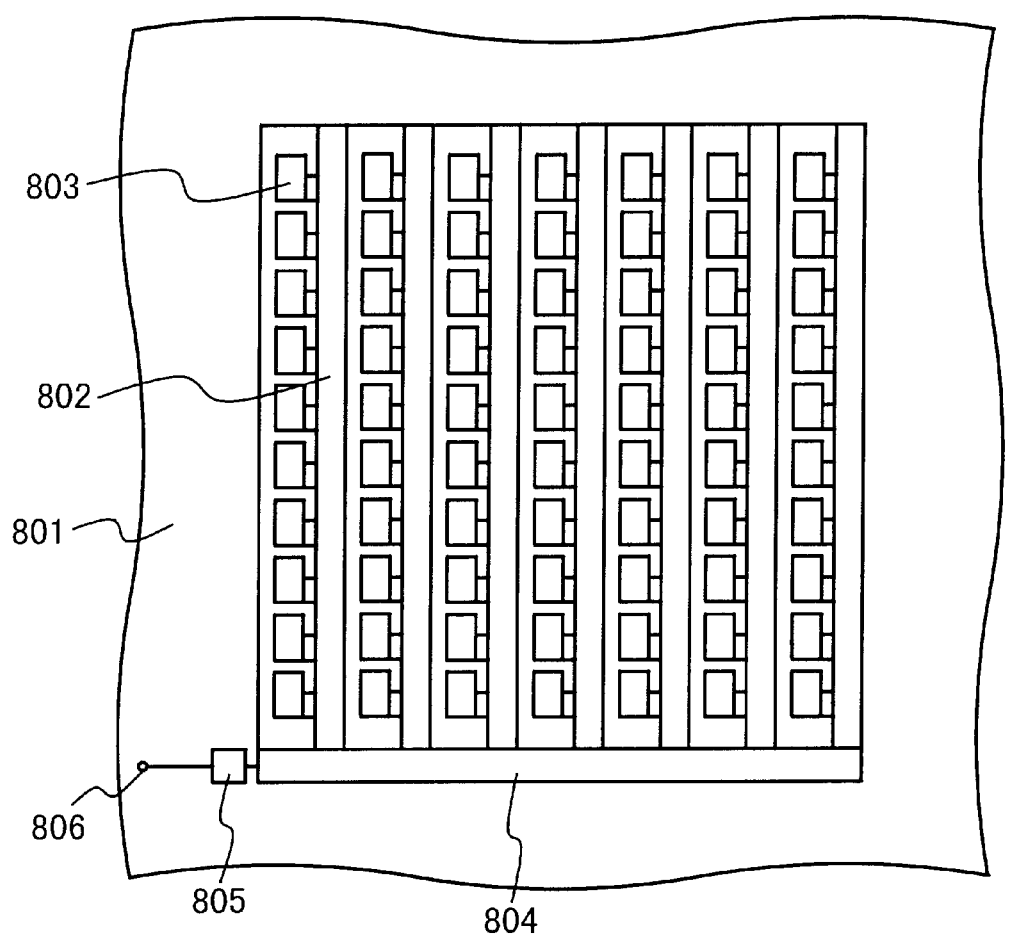
FIG. 1 is a diagram illustrating the structure of an interline transfer type solid state image sensor.
Figure 2:
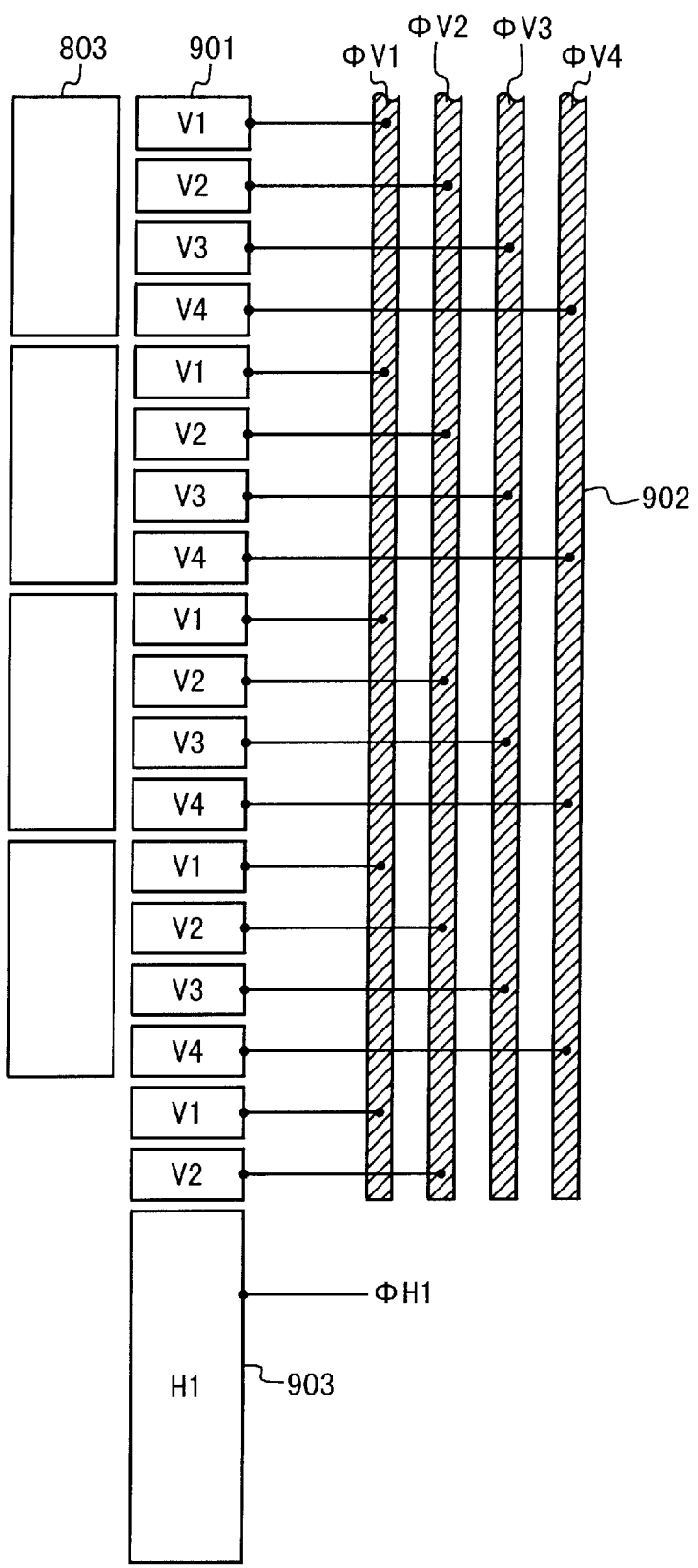
FIG. 2 is a diagram to explain the arrangement of transfer electrodes of groups of vertical charge transfer registers and photoelectric converting elements and the connection between bus lines and the transfer electrodes.
Figures 4A, 4B, 4C, 4D, 4E:
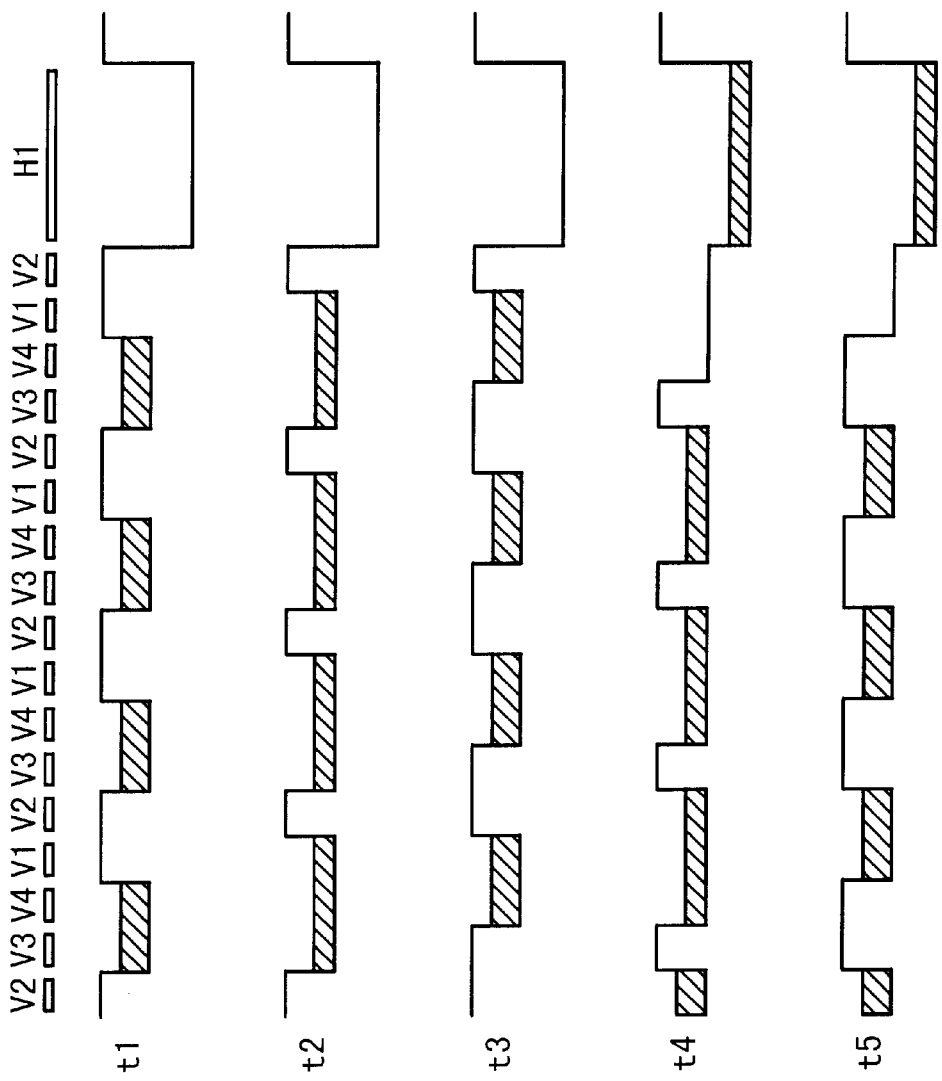
FIGS. 4A to 4I are diagrams illustrating the accumulation states of signal charges in the group of vertical charge transfer registers at each timing of FIGS. 3A to 3E.
Figures 4F, 4G, 4H, 4I:
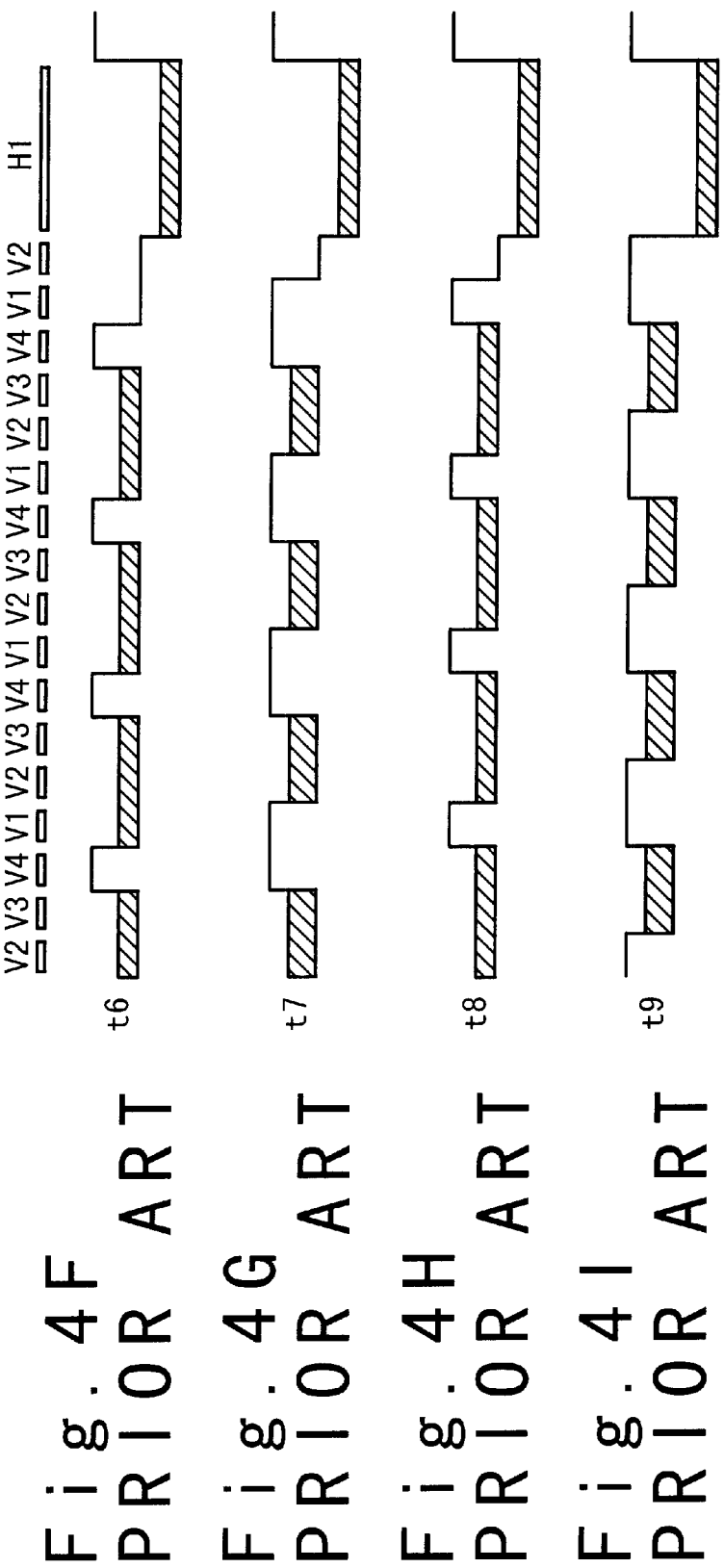

First, the solid state image sensor according to the first embodiment of the present invention will be described below. The solid state image sensor in the first embodiment of the present invention has the same structure as shown in FIG. 1.

Figure 7:
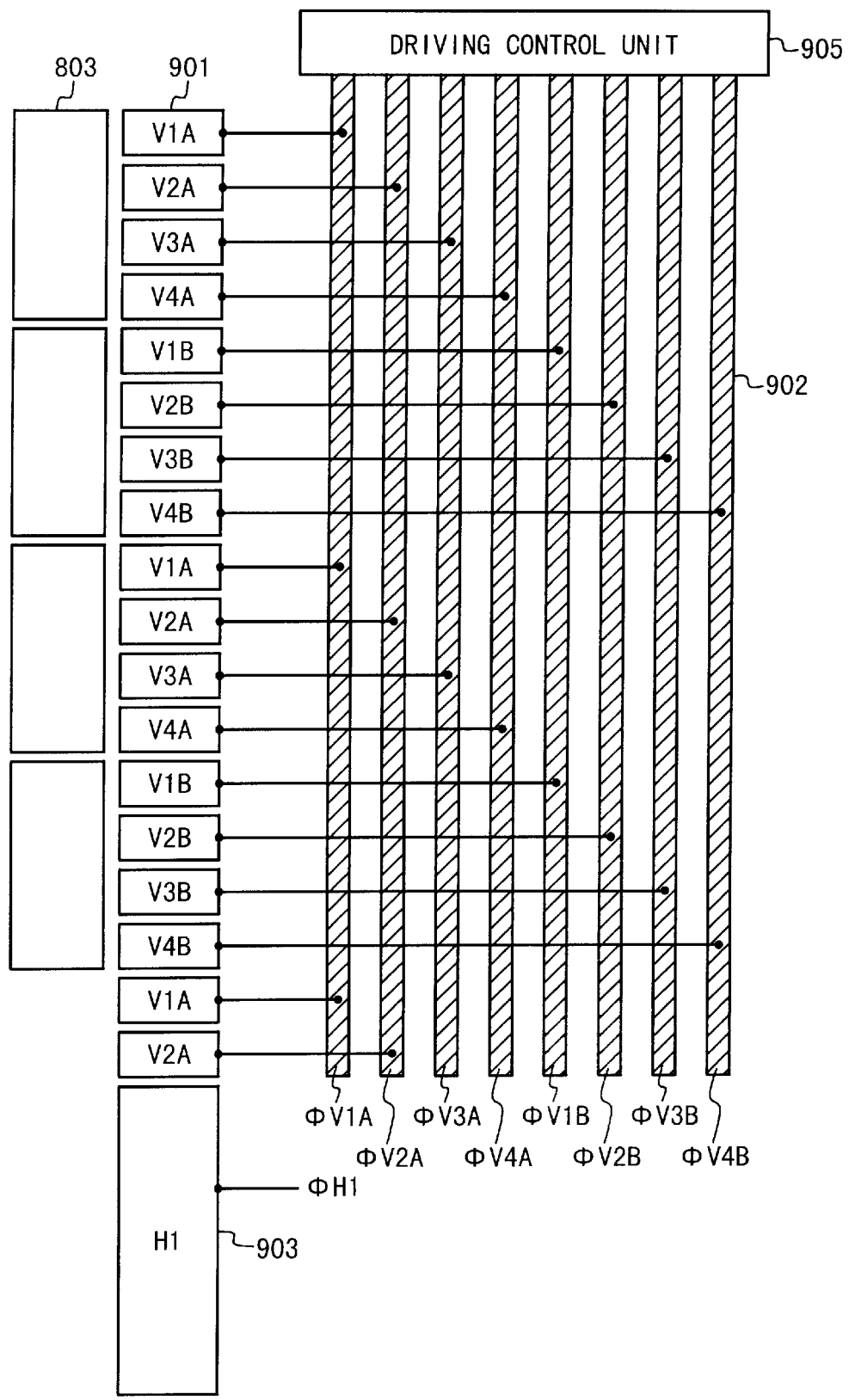
FIG. 7 is a block diagram illustrating the arrangement of transfer electrodes of a group of vertical charge transfer registers and photoelectric converting elements in a solid state image sensor according to a first embodiment of the present invention.

FIG. 7 is a block diagram illustrating the arrangement of transfer electrodes of a group of vertical charge transfer registers and photoelectric converting elements in the solid state image sensor according to the first embodiment of the present invention. FIG. 7 shows the solid state image sensor of an individual pixel read system, and the group of vertical charge transfer registers are driven with the 4-phase pulses as drive clock signals.

In the solid state image sensor shown in FIG. 7 according to the first embodiment of the present invention, four vertical transfer electrodes 901 are arranged to one photoelectric converting element 803 to form a unit pixel. Also, the vertical transfer electrodes 901 of two adjacent pixels in the vertical direction, for example, the vertical transfer electrodes V1A and V1B are independently connected to the vertical bus lines 902 such that they are supplied with individual pulses. The pulses φV1A, φV2A, φV3A, φV4A, φV1B, φV2B, φV3B and φV4B are supplied from a driving control unit 905.

Next, a method of driving the solid state image sensor according to the first embodiment of the present invention will be described. In the first embodiment, the solid state image sensor is operated such that a signal charge of each photoelectric converting element is individually outputted or signal charges from a plurality of adjacent photoelectric converting elements in the vertical direction are added and outputted. The number of phases of pulse used to drive the group of vertical charge transfer registers and the number of accumulation electrodes are switched between the above operations. More specifically, the number of phases of the pulse to used to drive the group of vertical charge transfer registers is switched between the individual pixel read mode and the 2-pixel read mode.

FIGS. 8A to 8I are timing charts illustrating the pulses which are applied to the group of vertical transfer electrodes V1A to V4A and V1B to V4B and the horizontal transfer electrode H1 during the horizontal blanking period, in the individual pixel read mode. In this mode, pulses φV1A and φV1B, φV2A and φV2B, φV3A and φV3B, and φV4A and φV4B are in phase. That is, the group of vertical charge transfer registers is driven with pulses φV1A to φV4A. FIGS. 9A to 9I are the accumulation state of the signal charges by the vertical charge transfer registers at each timing of FIGS. 8A to 8I. The transfer operation of the signal charges is the same as in the conventional example shown in FIGS. 4A to 4I. That is, the signal charges are transferred to the horizontal charge transfer register H1 at the timings t1 to t9 in order.

FIGS. 10A to 10I are timing charts illustrating the pulses which are applied to the vertical transfer electrodes V1A to V4A and V1B to V4B and the horizontal transfer electrode H1 during the horizontal blanking period, in the 2-pixel read mode. In this mode, the respective pulses φV1A, φV2A, φV3A, φV4A, φV1B, φV2B, φV3B, and φV4B are applied to the vertical transfer electrodes V1A to V4A and V1B to V4B of two adjacent pixels in the vertical direction to drive the group of vertical charge transfer registers in the 8-phase pulses.

FIGS. 11A to 11M illustrating the accumulation states of signal charges by the group of vertical charge transfer registers at each timing of FIGS. 10A to 10I. The signal charges are transferred in the group of vertical charge transfer registers in the state which the signal charges are accumulated in at least four continuous vertical transfer electrodes. That is, the signal charge is read out from the photoelectric converting element and accumulated under the four transfer electrodes V1A to V4A at a timing t1. The accumulated signal charge is transferred under the five transfer electrodes V1A to V4A and V1B. At this timing and the subsequent timing, another signal charge is read out from the other photoelectric converting element and is added to the already accumulated signal charge. The added signal charge is transferred to the horizontal transfer register in accordance with the subsequent timings.

Compared with the pulse width in the conventional method shown in FIGS. 5A to 5E, the pulse width is long in the driving method of the present invention, as shown in FIGS. 10A to 10I. Therefore, even if the waveform of the pulse is deformed due to the propagation delay of the pulse, the decrease of the pulse duration can be restrained. Therefore, the decrease of the maximum transfer quantity of signal charge in the vertical charge transfer section can be prevented.

Now, the maximum transfer quantity of signal charges in the group of vertical charge transfer registers in the 2-pixel read mode will be described below. For instance, it is supposed that the horizontal blanking period is 3 $\mu$s, and the time constant of the pulse propagation delay of the vertical transfer electrode is 0.14 $\mu$s. In this case, the pulse width, i.e., the time period during which the pulse is in a low level in the conventional driving method shown in FIGS. 5A to 5E is about 0.6 $\mu$s. On the other hand, the pulse width in the driving method in the present invention shown in FIGS. 10A to 10I is about 1.6 $\mu$s. In this manner, the substantial pulse width is about 76% of the pulse width in the pulse supply source in the conventional driving method, and is about 99% of that in the driving method in the present invention. As a result, the maximum transfer quantity of signal charge by the group of vertical charge transfer registers in the driving method of the present invention is more by about 1.3 times, compared with the conventional driving method.

As another example, the case will be considered in which the horizontal blanking period is 3 $\mu$s, and the time constant of the pulse propagation delay of the vertical transfer electrode is 0.3 $\mu$s In this case, the pulse width is about 0.6 $\mu$s in the conventional driving method shown in FIGS. 5A to 5E. On the other hand, the pulse width is about 1.6 $\mu$s in the driving method of the present invention shown in FIGS. 10A to 10I. In this manner, the substantial pulse width is about 50% of the pulse width in the pulse supply source in the conventional driving method, and is about 99% of that in the driving method of the present invention. As a result, the maximum quantity of signal charge processed in the group of vertical charge transfer registers by the driving method of the present invention is as much as about 2 times, compared with the conventional driving method.

Next, the method of driving the solid state image sensor according to the second embodiment of the present invention will be described below.

In the second embodiment, the pulse timings in the individual pixel read mode are the same as in the first embodiment. FIGS. 12A to 12I are timing charts illustrating the pulses which are applied to the group of vertical transfer electrodes V1A to V4A and V1B to V4B and the horizontal transfer electrode H1 during the horizontal blanking period in the 2-pixel read mode. The vertical transfer electrodes V1A to V4A and V1B to V4B for two adjacent pixels in the vertical direction are supplied with independent pulses $\phi$V1A, $\phi$V2A, $\phi$V3A, $\phi$V4A, $\phi$V1B, $\phi$V2B, $\phi$V3B, and $\phi$V4B such that the group of vertical charge transfer registers is driven in 8-phase pulses.

FIG. 13A to 13M are diagrams illustrating the accumulation states of the signal charges in the group of vertical charge transfer registers V1A to V4A and V1B to V4B at each timing of FIGS. 12A to 12I. The signal charge is transferred into the group of vertical charge transfer registers in the state in which the signal charge is accumulated under the at least six continuous vertical transfer electrodes. That is, the signal charges are read out from the two adjacent photoelectric converting elements and accumulated under the six transfer electrodes V3B, V4B and V1A to V4A at a timing t1. The accumulated signal charges are transferred under the seven transfer electrodes V3B, V4B, V1A to V4A and V1B at a timing t2. The accumulated signal charges are transferred to the horizontal transfer register in accordance with the subsequent timings.

In the second embodiment, since the pulse width is short, compared with the first embodiment, the transfer charge quantity due to the pulse waveform deformation cannot be restrained. However, the number of vertical transfer electrodes to which the high level voltage is applied to set the accumulation state of the signal charge increases from 4 transfer electrodes as shown in FIGS. 11A to 11M to 6 transfer electrodes as shown in FIG. 13A to 13M. Therefore, the maximum transfer quantity of signal charge increases to about 1.5 times. Thus, when the propagation delay of the pulse is small, the second embodiment is superior to the first embodiment.

In the above-mentioned example, when the time constant of the pulse propagation delay is 0.14 $\mu$s , the second embodiment is superior. However, when the time constant of the pulse propagation delay is 0.3 $\mu$s, the first embodiment is superior.

As described above, according to the present invention, in the mode in which the signal charges of two adjacent photoelectric converting elements in the vertical direction are added and outputted, the driving method is switched from the 4-phase pulse driving method to the 8-phase pulse driving method to increase the maximum transfer quantity of signal charges by the group of vertical charge transfer registers.

Also, in the above description, the read out signal charge are accumulated under the 4 or 5 continuous transfer electrodes or the 6 or 7 continuous transfer electrodes. However, the signal charge may be accumulated under the 5 or 6 continuous transfer electrodes.

What is claimed is:

1. An image sensor comprising:
   photoelectric converting elements arranged in a column direction, for generating signal charges, respectively;
   k transfer electrodes (k is a positive integer more than 1) provided for each of said photoelectric converting elements in the column direction; and
   2k signal lines connected to said transfer electrodes for adjacent two of said photoelectric converting elements, and used to supply driving clock signals to said transfer electrodes for adjacent two photoelectric converting elements, respectively, such that the signal charges are transferred based on said driving clock signals.

2. An image sensor according to claim 1, further comprising a driving control circuit connected to said 2k signal lines, for switching a number of phases of said driving clock signals based on a mode.

3. An image sensor according to claim 2, wherein said driving control circuit supplies said driving clock signals of k phases to said 2k signal lines in an individual pixel read mode such that an in-phase driving clock signal is supplied to corresponding ones of said transfer electrodes for the adjacent two photoelectric converting elements.

4. An image sensor according to claim 2, wherein said driving control circuit supplies said driving clock signals of phases different from those in the individual pixel read mode to said 2k signal lines in a 2-pixel read mode such that the signal charges of the adjacent two of said photoelectric converting elements are added in response to the supply of said driving clock signals to said transfer electrodes for the adjacent two of said photoelectric converting elements.

5. An image sensor according to claim 2, wherein said driving control circuit supplies said driving clock signals of 2k phases to said 2k signal lines in a 2-pixel read mode such that said driving clock signals of different phases are respectively supplied to said transfer electrodes for the adjacent two photoelectric converting elements.

6. An image sensor according to claim 5, wherein k is 4, and the signal charges of the adjacent two of said photoelectric converting elements are transferred in a state in which the signal charges are accumulated under 4 or 5 continuous ones of said transfer electrodes.

7. An image sensor according to claim 5, wherein k is 4, and the signal charges of the adjacent two of said photoelectric converting elements are transferred in a state in which the signal charges are accumulated under 5 or 6 continuous ones of said transfer electrodes.

8. An image sensor according to claim 5, wherein k is 4, and the signal charges of the adjacent two of said photoelectric converting elements are transferred in a state in which the signal charges are accumulated under 6 or 7 continuous ones of said transfer electrodes.

9. A method of transferring signal charge in an image sensor, comprising the steps of:

generating signal charges by photoelectric converting elements arranged in a column direction;

outputting driving clock signals to 2k (k is a positive integer more than 1) signal lines;

transferring the signal charges by transfer electrodes in response to said driving clock signals, wherein k ones of said transfer electrodes are provided for each of said photoelectric converting elements in the column direction, and 2k continues ones of said transfer electrodes are respectively connected to said 2k signal lines.

10. A method according to claim 9, further comprising the step of switching a number of phases of said driving clock signals based on a mode.

11. A method according to claim 10, wherein said outputting step includes outputting said driving clock signals of k phases to said 2k signal lines in an individual pixel read mode such that an in-phase driving clock signal is supplied to corresponding ones of said transfer electrodes for adjacent two of said photoelectric converting elements.

12. A method according to claim 10, wherein said outputting step includes outputting said driving clock signals of phases different from those in the individual pixel read mode to said 2k signal lines in a 2-pixel read mode such that the signal charges of the adjacent two of said photoelectric converting elements are added in response to the supply of said driving clock signals to said transfer electrodes for the adjacent two of said photoelectric converting elements.

13. A method according to claim 10, wherein said outputting step includes outputting said driving clock signals of 2k phases to said 2k signal lines in a 2-pixel read mode such that said driving clock signals of different phases are respectively supplied to said transfer electrodes for the adjacent two of said photoelectric converting elements.

14. A method according to claim 13, wherein k is 4, and said transferring step includes transferring the signal charges of the adjacent two of said photoelectric converting elements in a state in which the signal charges are accumulated under 4 or 5 continuous ones of said transfer electrodes.

15. A method according to claim 13, wherein k is 4, and said transferring step includes transferring the signal charges of the adjacent two of said photoelectric converting elements in a state in which the signal charges are accumulated under 4 or 5 continuous ones of said transfer electrodes.

16. A method according to claim 13, wherein k is 4, and said transferring step includes transferring the signal charges of the adjacent two photoelectric converting elements are transferred in a state in which the signal charges are accumulated under 6 or 7 continuous ones of said transfer electrodes.

* * * * *